Feb. 28, 1933.  E. P. SACREY  1,899,883
ADJUSTABLE AND INTERCHANGEABLE MOUNTING FOR MOTOR DRIVEN TOOLS
Filed June 25, 1930  2 Sheets-Sheet 2
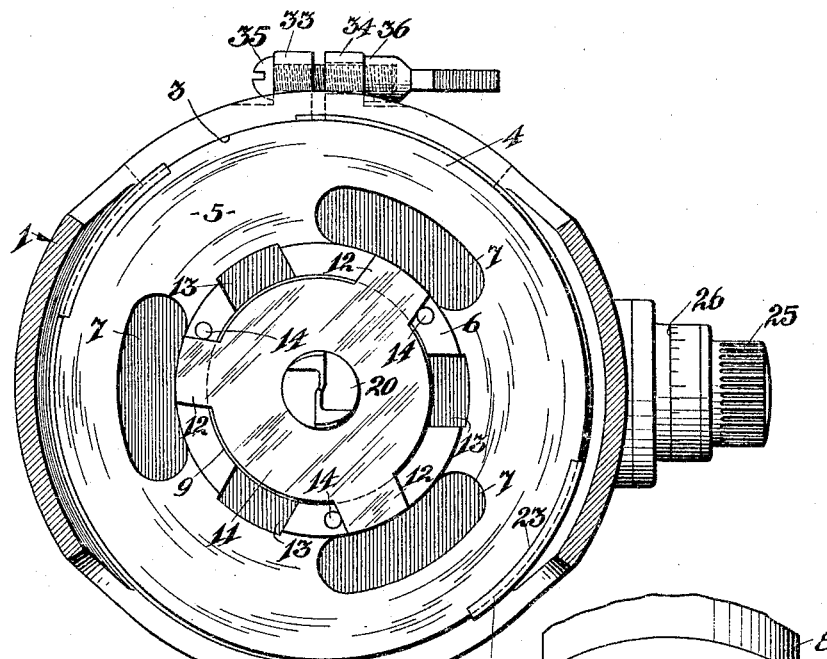
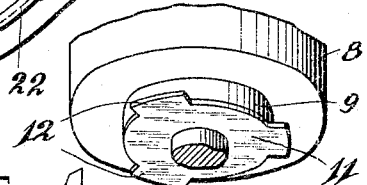
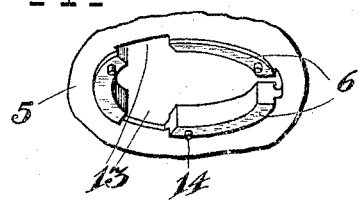
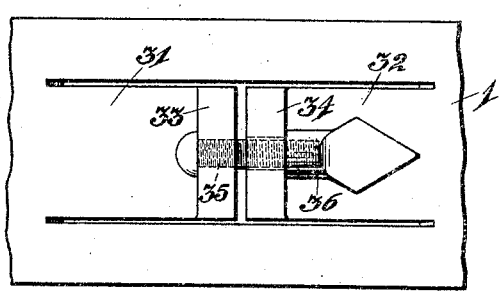
INVENTOR:
Elmer P. Sacrey,
BY Bodell & Thompson
ATTORNEYS.

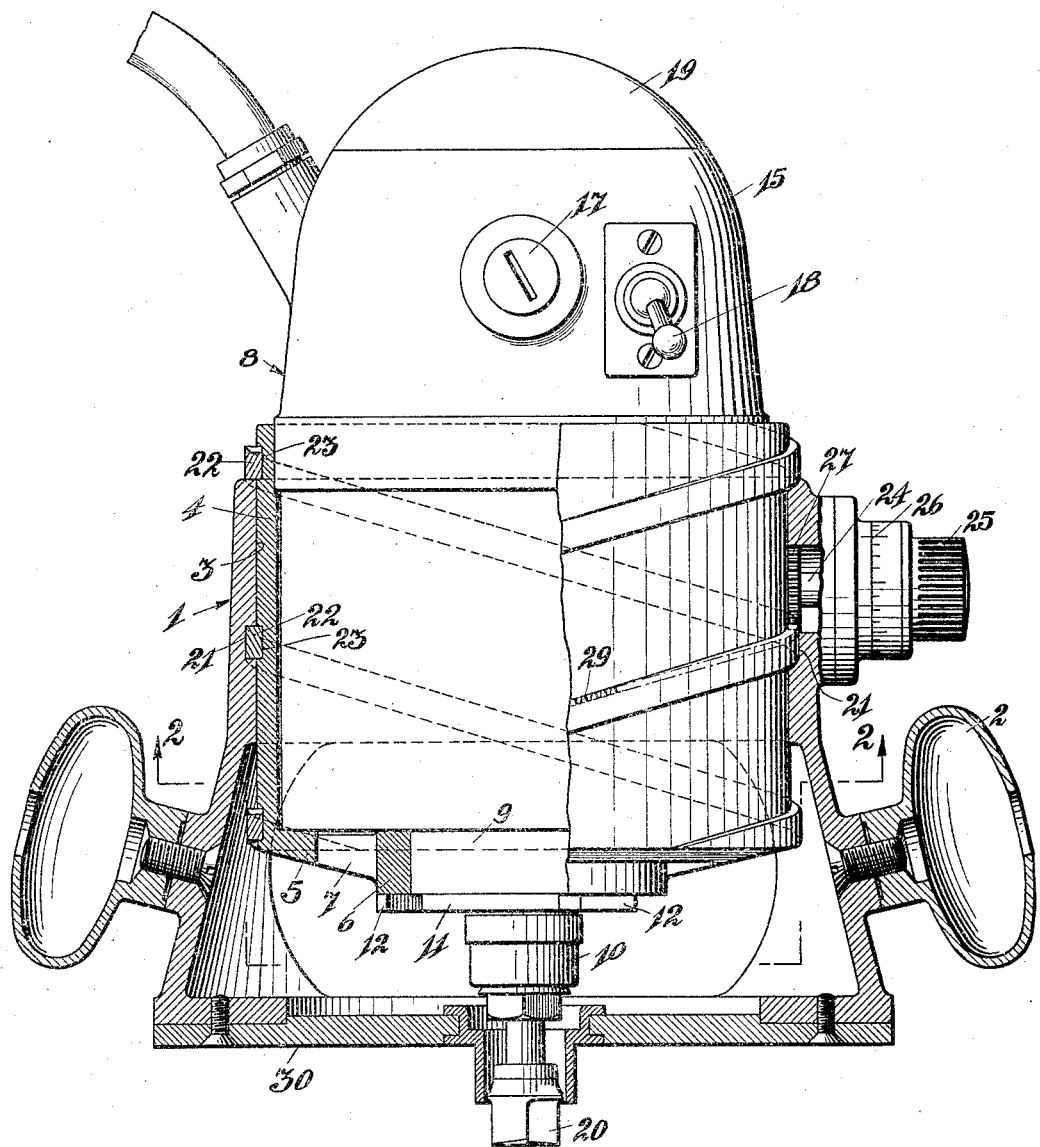

Patented Feb. 28, 1933

1,899,883

UNITED STATES PATENT OFFICE

ELMER P. SACREY, OF LIVERPOOL, NEW YORK

ADJUSTABLE AND INTERCHANGEABLE MOUNTING FOR MOTOR DRIVEN TOOLS

Application filed June 25, 1930. Serial No. 463,769.

This invention relates to motor driven tools and has for its object a particularly simple and efficient construction whereby one motor is interchangeably mountable in different types of tool holders or bodies and also a particularly simple construction by which the motor and hence the tool can be adjusted axially as a unit relatively to the tool body for varying the cutting depth of the tool.

The invention consists in the novel features and in the combinations and constructions hereinafter set forth and claimed.

In describing this invention, reference is had to the accompanying drawings in which like characters designate corresponding parts in all the views.

Figure 1 is an elevation, partly in section, of a tool embodying my invention.

Figure 2 is a sectional view on line 2—2, Figure 1.

Figure 3 is a detail view of a means for clamping the main body of the tool on the motor carrier.

Figure 4 is an exploded detail view of the interlocking joint between the motor and the body or the motor carrier or sleeve section thereof.

This tool comprises generally a holder or body formed with a recess for receiving an electric motor, the body and the motor being provided with means for firmly interlocking upon relative endwise and partial rotary movement of the body and the motor whereby the motor with its tool is readily removable and replaceable or interchangeable in another tool holder or body and also means by which the motor can readily be adjusted axially to vary the cutting depth of the tool.

The invention particularly applies to portable tools such as routers, shapers, planers and the like in which the cutting tool is actuated by an electric motor.

1 designates one of the bodies in which the motor is interchangeably mountable, the body illustrated being provided with suitable handles 2. Each body is provided with a recess for receiving an electric motor, the recess being open at its outer end and being provided at its inner end with a hub through which a portion of the motor or motor unit extends and is located, and also through which the motor shaft extends. The motor and the hub are provided with means which interlock upon the relative endwise and partial rotary movement.

As in the illustrated embodiment of my invention, the motor is adjustable axially, the body is composed of a main section having a cylindrical passage 3 and a motor carrier or sleeve section 4 located in the passage 3 and this sleeve section provides a recess for the motor. The sleeve portion is open at its upper end and has a bottom 5 at its lower end for carrying a hub 6, the bottom being provided with ventilating openings 7. Thus, the sleeve is a carrier for the motor, which motor is detachably secured to or interlocked with the carrier, so that the motor can be readily detached, replaced or interchanged without upsetting any adjustment, as will be hereinafter explained.

8 designates the motor. The motor shaft is provided with any suitable chuck 10 for receiving a tool and is also provided with a locking member 11 carried thereby concentric with the motor shaft and here shown as carried by a neck 9 on the motor frame. This locking member is here shown as a disk or plate provided with one or more radially extending arms 12. The hub 6 is formed with lengthwise slots 13 extending through its upper and lower ends and being of sufficient width to permit the arms 12 to pass therethrough. When the motor is being placed in the carrier or sleeve section 4, the arms 12 pass downwardly through the slots 13 until the locking member and its arms are below the lower end of the hub 6 and then the motor is given a partial turn to interlock the arms 12 of the locking member under the lower end of the hub, the turning movement of the motor being limited by pins 14 engaging the arms 12. To remove the motor, the reverse of this operation takes place.

The upper end of the motor is closed by a top section 15 secured to the motor frame and in this top section 15, the commutator and the brushes of the motor are located and also a suitable controlling switch.

17 designates one of the brush holders and 18 the operating member of the controlling switch. The upper end of the section 15 is closed by a removable cap 19. The section 15, cap 19 and associated parts form no part of this invention.

20 designates a tool as a router mounted in the chuck 10.

The workman has several tool holders for different classes of work and one motor and different types of cutting or grinding tools attachable thereto. When it is desired to change the motor from one tool holder to another, the operator turns the motor and hence the locking member 11 until the arms 12 are in alinement with the slots 13 and lifts the motor bodily out of the holder body, the arms 12 passing out through the slots 13. The motor is then placed in another holder by the reverse of this operation.

In order to adjust the cutting depth of the tool, the sleeve section 4 is provided and so mounted in the passage 3 as to be adjustable lengthwise of the passage.

As here illustrated, the sleeve and the wall of the passage 3 are provided with spiral means, the main section or the wall of the passage 3 thereof being shown as provided with spiral grooves 21 and the sleeve being provided with a complemental projection 22 in the groove 21. This projection is here shown as a separate piece or strip fixed in a spiral groove 23 formed in the wall of the sleeve 4. As clearly seen in the drawings, there are preferably two of such spiral projections or strips 22 having a relatively coarse pitch so that but a partial turning of the sleeve will effect a comparatively large axial adjustment of the motor and the sleeve, and hence the tool. The projections or strips 22 are preferably rectangular in cross section and the grooves 21 and 23 are also rectangular and fit the strips. The strip is secured in or tightly fits one of the grooves, preferably the groove 23 in the sleeve and slidably fits the other groove 21. Owing to the rectangular strips 22 and the corresponding rectangular groove 21, in which they slide, all chucking or lateral play of the sleeve, and hence of the motor and the tool is avoided, such as occurs when screw threads are employed. Thus, by reason of the coupling between the motor and the sleeve carrier, the tool is held in accurate axial alinement with the sleeve carrier and by reason of the rectangular spiral strips 22 or their equivalent, the sleeve carrier is held in accurate alinement in the main section of the body 1. The means for adjusting the motor and its tool axially to vary the cutting depth of the tool acts to turn the sleeve section 4, and thus owing to the spiral means shift the section 4 upwardly or downwardly carrying the motor therewith. This is a micrometer adjustment comprising a shaft 24 mounted in the main body 1 and having an operating knob 25 on its outer end and also having a micrometer scale 26, a pinion 27 mounted on the inner end of the shaft and meshing with the rack teeth 29 formed along one side of one of the spiral projections 22. Obviously, by turning the knob and hence the shaft 24 and pinion 27, the shaft 24 will be turned transmitting its movement to the rack 29 to the sleeve section 4 and thereby turn the sleeve section 4 and hence shift the motor axially and thus vary the cutting depth of the tool relatively to the lower surface 30 of the main body.

In order to hold the sleeve 4 in its adjusted position, the body is provided with resilient tongues 31 and 32, that is with a split portion, which tongues when tensioned have a contracting action to grip the sleeve section 4 and when relieved of the tension, releases the gripping action on the sleeve section 4.

As here illustrated, the tongues 31, 32 are provided with opposing lugs 33, 34 for receiving a clamping member as a screw 35 threading through one lug 33 and extending through the other lug 34. The turning of the nut 36 will tighten or loosen the gripping action on the sleeve section 4. Therefore, before the adjustment can be made by means of the micrometer, the screw 35 is turned in one direction to loosen the sleeve section 4 and after the adjustment is completed, the screw is tightened.

This tool construction is particularly advantageous in that a workman can have different machines or appliances, such as plane, shaper, router, saw etc. and can readily interchange one motor to serve all the machines.

What I claim is:

1. In a motor driven tool, the combination of a body provided with a motor receiving recess open at its outer end, a motor placeable in the recess through the outer end thereof, the bottom wall of the recess being provided with a hub having a lengthwise slot opening through its opposite ends and the motor having a fixed member mounted concentric with its shaft and movable through the slot upon relative endwise movement of the motor when being placed into and out of the recess and movable into and out of interlocking engagement with the outer end wall of the hub upon relative rotary movement of the body and said member, all whereby the motor is removable and replaceable in the body and interlocked therein upon relative endwise and rotary movement of the body and the motor.

2. In a motor driven tool, the combination of a body portion formed with a passage therein; a sleeve section slidably fitting the passage and formed with a recess; a motor detachably mounted in the sleeve section and within said recess; and means for adjusting the motor and the sleeve section as a unit, axially of the main section for varying the depth of the cut of the tool actuated by the motor.

3. In a motor driven tool, a body portion formed with a passage; and a sleeve section mounted in the passage; a motor detachably secured in the sleeve section and having a shaft provided with means for holding a tool; spiral interlocking means connecting the sleeve section and body portion; and means mounted on the body portion and coacting with the sleeve section to turn the same and thereby shift the sleeve section and the motor, as a unit, axially to vary the cutting depth.

4. In a motor driven tool, a body portion formed with a passage and a sleeve section mounted in the passage; a motor secured in the sleeve section and having a shaft provided with means for holding a tool; spiral interlocking means connecting the sleeve section and the body portion; means mounted on the body portion and coacting with the sleeve section to turn the same and thereby shift the sleeve section and the motor, as a unit, axially to vary the cutting depth; and means detachably connecting the motor and the sleeve section and interlocking upon the relative endwise and partial rotary movement of the sleeve section and the motor.

5. A motor driven tool including in combination, a body portion formed with a passage therein; a sleeve portion adjustable axially of the passage, the sleeve section being open at its outer end; a motor detachably mounted in the sleeve section and having its shaft extending through a hub in the sleeve, the motor also being provided with means for interlocking with the sleeve upon relative endwise movement and partial rotary movement of the motor and the sleeve; means on the motor shaft for carrying a tool; and means for adjusting the sleeve section axially to vary the cutting depth of the tool.

6. In a motor driven tool, a body comprising a supporting section and a carrier, a motor supported by the carrier; means for detachably securing the motor to the carrier, whereby they act as a unit; the motor having its shaft provided with means for holding the tool; and means for adjusting the carrier and the motor as a unit, relatively to the main section of the body, including manual micrometer adjusting means mounted on the main section.

7. In a motor driven tool, a body including a main section formed with a passage and a carrier section in the passage, the carrier section being in the form of a sleeve; a motor detachably securable in the sleeve section and having a shaft provided with a tool; opposing surfaces of the main section of the body and the sleeve being provided with spiral interlocking means whereby the sleeve is slidable in the main section; and manually operable means on the main section for turning the sleeve with respect to the main section to shift the sleeve axially and for holding it in its adjusted position.

8. In a motor driven tool, a body including a main section formed with a passage and a carrier section in the passage, the carrier section being in the form a sleeve; a motor section being in the sleeve section and detachably securable in the sleeve section and having a shaft provided with a tool; opposing surfaces of the main section of the body and the sleeve being provided with spiral interlocking means whereby the sleeve is slidable in the main section; manually operated gear means for turning the sleeve with respect to the main section to shift the sleeve axially; and means for holding the sleeve in adjusted position.

9. The combination as called for in claim 8, the gear means including a rack and pinion mechanism.

10. In a motor driven tool, a body portion formed with a passage; a motor having a shaft provided with means for holding a tool and having a housing, slidably fitting the passage, mounted in the passage; spiral interlocking means connecting the motor housing and the body portion; and means mounted on the body portion and coacting with the motor housing to turn the same and thereby shift the motor axially to vary the cutting depth.

11. In a motor driven tool, a body portion formed with a passage; a motor having a shaft provided with means for holding a tool and having a housing slidably fitting the passage, mounted in the passage; opposing surfaces of the body portion and the motor housing being provided with spiral interlocking means whereby the motor housing is slidable in the body portion; manually operated gear means for turning the motor housing with respect to the body portion to shift the motor axially; and means for holding the motor in adjusted position.

12. The combination as called for in claim 11, the gear means including a rack and pinion mechanism.

In testimony whereof, I have hereunto signed my name at Syracuse, in the county of Onondaga, and State of New York, this 20th day of June, 1930.

ELMER P. SACREY.